United States Patent [19]

Kobelt

[11] 3,766,835

[45] Oct. 23, 1973

[54] MULTI-POSITION ACTUATOR

[76] Inventor: Jack R. Kobelt, 6110 Oak St., Vancouver, British Columbia, Canada

[22] Filed: Dec. 6, 1971

[21] Appl. No.: 204,963

[52] U.S. Cl.......................... 92/68, 74/104, 74/110, 92/13.3
[51] Int. Cl............................................. F01b 7/04
[58] Field of Search...................... 92/13, 13.3, 13.4, 92/13.41, 2, 62, 68, 76, 5; 74/104, 110

[56] References Cited
UNITED STATES PATENTS

| 707,370 | 8/1902 | Walton | 92/13 X |
|---|---|---|---|
| 963,923 | 7/1910 | McKerahan | 74/110 X |
| 1,939,284 | 12/1933 | Sladky et al. | 74/104 X |
| 3,088,441 | 5/1963 | Bacchi | 91/417 R X |
| 3,253,518 | 5/1966 | Duemler | 74/104 X |
| 3,696,684 | 10/1972 | Estlick | 74/104 |
| 3,704,986 | 12/1972 | Sheesley et al. | 74/104 X |
| 707,370 | 8/1902 | Walton | 92/13 |
| 789,081 | 5/1905 | Cravens | 92/68 |
| 1,580,249 | 4/1926 | Hornor | 92/68 |
| 2,262,563 | 11/1941 | Stacy | 92/62 |
| 2,815,901 | 12/1957 | Hale | 92/68 |
| 2,946,320 | 7/1960 | Vogel | 92/68 |
| 3,152,520 | 10/1964 | Heese | 92/62 |
| 3,630,019 | 12/1971 | Kress | 92/68 |

Primary Examiner—Martin P. Schwadron
Assistant Examiner—Abe Hershkovitz

[57] ABSTRACT

This disclosure pertains to a novel mechanical means adapted for use with mechanical devices having more than one controlled position of operation, including a neutral position. A plurality of linear actuators are mounted in an assembly frame whereby their actuating forces are transmitted through torque arms to an actuator shaft, thus causing an actuator arm to assume responsive positions in a position arc. The actuator shaft torque created by a positioning linear actuator is opposed by a lesser torque created by a neutralizing linear actuator, leaving a torque differential sufficient to operate the mechanical device ultimately actuated. Where the neutral position is at either end of the position arc, one neutralizing linear actuator is required to hold the actuator arm against a stop in the position arc. Where the neutral position is required at some location inside the position arc, two neutralizing linear actuators are required. Each position other than neutral requires a positioning linear actuator. It is obvious from the foregoing description that many combinations of number and location of actuated positions are possible. The preferred embodiment of the invention disclosed herein illustrates one such combination having a central neutral and three controlled positions in each direction along the position arc.

9 Claims, 4 Drawing Figures

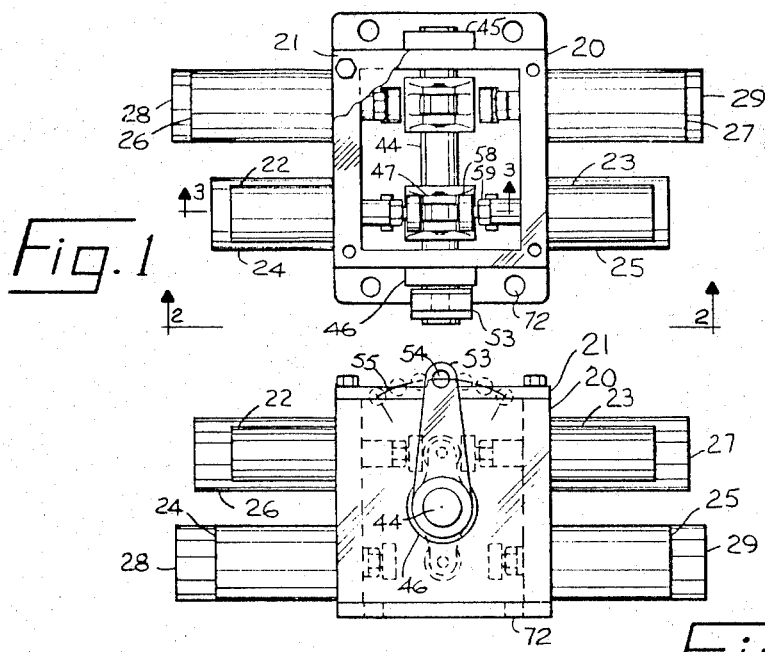
Fig. 1
Fig. 2
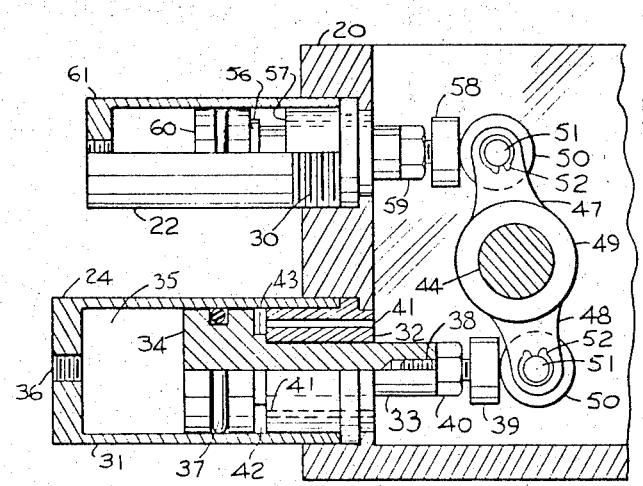
Fig. 3
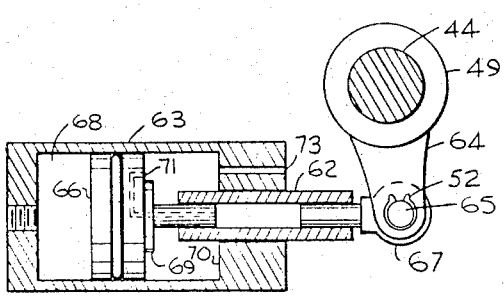
Fig. 4

MULTI-POSITION ACTUATOR

This invention relates to novel improvements in mechanical control devices and more particularly to remotely controlled fluid operated devices which convert fluid energy into mechanical energy for the ultimate actuation and control of other devices. In their simplest form, such devices normally comprise fluid operated linear actuators whose mechanical motion is either used directly or converted into indirect rotary motion through levers, torque arms, or cams.

A few of the requirements of such devices are reliability in repetitive operation, accuracy of movement, versatility of operation, universality of application, and compactness of form. Several applications where such devices may be applied are in the remote step-wise control of variable displacement hydraulic pumps and motors, gear transmission devices, and clutching and braking devices.

It is one object of this invention to provide a remotely controlled multi-position actuator adapted to convert fluid energy in linear actuators into mechanical energy in a pivotal actuator arm.

It is another object of this invention to provide a multi-position actuator having a neutral position which may be preset at any point on a position arc.

It is a further object of this invention to provide a multi-position actuator having operating positions which may be preset at any points on a position arc and whose operation permits direct change from neutral to any position and from any one position to any other position.

Still another object of this invention is to provide a multi-position actuator whose neutral position may be a fail-safe position to which the actuator automatically returns and the linear actuator or actuators which determine the neutral position do not require manual or other direct control.

Yet another object of this invention is to provide a multi-position actuator whose accuracy of movement depends upon the pistons of positioning linear actuators bottoming out and, consequently, upon the machining accuracy of the mechanical surfaces involved.

A further object of this invention is to combine the elements thereof in as compact a form as possible.

These and still further objects and advantages of the present invention reside in the details of construction of a preferred embodiment disclosed herein and will be evident to one skilled in the art from a study of the specification and the accompanying drawings. Therefore the preferred embodiment disclosed is merely exemplary and is not intended to detract from the full scope of the invention as set out in the annexed claims.

In the drawings, wherein like numerals refer to like parts:

FIG. 1 is a plan view of a multi-position actuator in accordance with the present invention wherein the cover of the assembly frame has been partially removed;

FIG. 2 is a side elevation view of the present invention taken substantially along line 2—2 of FIG. 1;

FIG. 3 is a partial sectional view of the present invention taken substantially along line 3—3 of FIG. 1;

FIG. 4 shows a sectional view through an alternative linear actuator embodiment having lost motion capacity at both the piston end and the outer end of the rod.

Turning now to the drawings, FIGS. 1, 2, and 3 show a preferred embodiment of the present invention. In this embodiment, 20 schematically represents the assembly frame of a multi-position actuator. Frame 20 may be bolted to a base by means of holes 72. The top cover 21 is shown partially removed in FIG. 1 and completely removed in FIG. 3. Mounted in assembly frame 20 are two neutralizing linear actuator means 22 and 23 and positioning linear actuator means 24, 25, 26, 27, 28 and 29. Whereas there are several obvious means by which the linear actuators 22, 23, 24, 25, 26, 27, 28, and 29 may be mounted in assembly frame 20, the means disclosed herein is by threading the outer fore-end of the cylinder portion of each linear actuator as illustrated typically by linear actuator 22 and thread 30 in FIG. 3.

Construction of the linear actuator means in the preferred embodiment may be examined in FIG. 3, where typical linear actuator 24 is shown in section. Cylinder portion 31 is threaded, as mentioned, into assembly frame 20. Rod bearing 32 is secured in frame 20 by cylinder portion 31. The actuating portion of linear actuator 24 comprises rod portion 33 and piston portion 34 integrally constructed. The actuating stroke is the total available lineal movement in each direction of rod portion 33 and piston portion 34 with respect to cylinder portion 31. Fluid entering chamber 35 through orifice 36 is contained by conventional circumferential seal means 37 in piston 34. The end of rod portion 33 is drilled and threaded to accept the threaded portion 38 of rod length adjusting means 39 which is locked in place by nut 40. A pair of breather holes 41 in bearing 32 permit fluid flow in and out of chamber 42 on the forward side of piston 34. Shoulder 43 limits the movement of piston 34 in its actuating direction while the length of the cylinder portion 31 must be great enough to accommodate the reverse motion of piston 34 as effected by other positioning linear actuators. For example, cylinder portions of linear actuators 23, 24, 27 and 28 must be long enough to accept the reverse piston movement caused by the activation of positioning linear actuator 29.

Actuator shaft 44 is pivotally mounted in bosses 45 and 46 of frame 20. Torque arm means 47 and 48 are secured to actuator shaft 44 by means of hub 49. Cam followers 50 are rotatably mounted at the ends of torque arm means 47 and 48 by means of pins 51 and snap rings 52.

Secured to one end of actuator shaft 44 is actuator arm 53. Hole 54 in actuator arm 53 occupies seven positions on position arc 55, as shown in broken lines in FIG 2. A link not shown may interconnect an actuated device to actuator arm 53 by means of hole 54.

Looking now at the operation of the multi-position actuator, neutralizing linear actuators 22 and 23 are shown holding actuator arm 53 in the central position in FIGS. 1 and 2. In this stable position, referring to FIG. 3, piston shoulder 56 is in contact with bearing 57 in both linear actuators 22 and 23. In practice, rod length adjusting means 58 and nut 59 permit this required simultaneous shoulder-to-bearing contact in both neutralizing linear actuators 22 and 23.

Referring now to FIG. 3, when a typical positioning linear actuator 24 is engaged, neutralizing linear actuator 23 (not shown) remains stable while piston and rod portion 60 of neutralizing linear actuator 22 is forced back into cylinder portion 61 until shoulder 43 is positioning linear actuator 24 contacts rod bearing 32. This, then, is one stable position other than neutral in the multi-position actuator. It follows, therefore, that each of positioning linear actuators 25, 26, 27, 28 and 29 will also produce distinct positions of actuator shaft 44 and actuator arm 53.

As each positioning linear actuator counters its respective neutralizing linear actuator, and as actuator shaft 44 rotates, it is evident that cam followers 50 are free to roll on the compression surfaces of rod length adjusting means 39 and 58, as shown in FIG. 3.

Another noteworthy point in the construction of the multi-position actuator is that whereas the rod portion of the linear actuator must vary in length to suit the required positions of actuator arm 53, an embodiment does exist where standardization would permit the cylinder portions of all linear actuators to be the same length, i.e., the length required by the linear actuator having the longest rod portion.

Further, with reference to FIG. 3, it is self-evident that the torque in actuator shaft 44 generated by torque arm 48 must be greater than that generated by torque arm 47. This torque differential is required to operate an actuated device dependent upon actuator arm 53. This may be accomplished typically in FIG. 3 by using a substantially equal fluid pressure in linear actuators 22 and 24 but making the area of piston 60 sufficiently smaller than piston 34 to create the aforementioned required torque differential. On the other hand, if the pistons 34 and 60 were substantially the same size and the fluid pressure in each linear actuator substantially the same, then torque arm 48 would have to be longer than torque arm 47 to create the necessary torque differential. Still another possibility, with pistons 34 and 60 substantially the same diameter and torque arms 47 and 48 substantially the same length, would be to use in neutralizing linear actuator 23 a fluid pressure which is substantially lower than that in positioning linear actuator 24.

It is apparent from the foregoing that the fluid pressure in neutralizing linear actuators 22 and 23 will be continuously maintained while the fluid pressure in a given positioning linear actuator will be applied only when its specific position is required. Moreover, the positioning linear actuators may be activated randomly; in other words, the actuator arm may be moved from neutral or any position to any other position without regard to the positions it passes through.

It should be noted that whereas two neutralizing linear actuators are shown in FIGS. 1, 2 and 3, thus permitting a neutral position to be contained within position arc 55, it would be possible to use a single neutralizing linear actuator if the neutral position were at one end of position arc 55. In such a case it would be necessary to provide a simple mechanical stop means in frame 20 against which a torque arm such as 47, actuator arm 53, or another radial extension on actuator shaft 44 would be brought to rest by the single neutralizing linear actuator.

Now, with reference to FIG. 4, it is evident that other than compression contact typically between the torque arms and the positioning linear actuators is possible. For example, the rod portion 62 of the linear actuator 63 may be pivotally connected to the torque arm 64 by pin 65 provided that the required motion of actuator shaft 44 is accommodated. FIG. 4 illustrates a case where piston portion 66 is free to slide axially with respect to rod portion 62 and eye portion 67 is free also to slide axially with respect to rod portion 62. In this way, when chamber 68 is pressurized, piston portion 66, rod portion 62 and eye portion 67 assume their shortest accumulated length to move torque arm 64 to its prescribed position with shoulder 69 against rod bearing 70. When the longer stroke of another positioning linear actuator acting in the same direction comes into effect the accumulated length of parts 62, 66 and 67 increases. Breather holes 71 and 73 allow free movement of parts 66, 62 and 67 with respect to each other. It should be noted that, for this arrangement, cylinder portion 63 must be pivotally mounted to frame 20 about a pivotal axis parallel to that of actuator shaft 44.

It will be appreciated that the foregoing discloses only a preferred embodiment of the present invention. Further, many equivalents, changes, and modifications will readily occur to one skilled in the art, particularly in view of the above teachings. Therefore, the present invention is not to be construed as limited to the specific details illustrated and described above.

The embodiments of the invention in which an exclusive property or privlege is claimed are defined as follows:

1. A multi-position actuator comprising an assembly frame, neutralizing linear actuator means operatively mounted in said assembly frame, positioning linear actuator means operatively mounted in said assembly frame, an actuator shaft pivotally mounted in said assembly frame, a torque arm means secured to said actuator shaft in opposed relation to the actuating portions of each of said linear actuator means, an actuator arm secured to said actuator shaft, at least one of said neutralizing and positioning linear actuator means comprising a cylinder portion and a piston and rod portion, said rod portion in compressive surface contact with a cam follower rotatably mounted on said torque arm means, a continuously maintained fluid pressure in said neutralizing linear actuator means, an intermittently applied fluid pressure in said positioning linear actuator means, said actuator arm assuming a normally neutral position on a position arc and an intermittently controlled position consequent to said intermittently applied fluid pressure in said positioning linear actuator means.

2. Apparatus as defined in claim 1, wherein said positioning linear actuator means comprise a plurality of linear actuators the predetermined lengths of whose actuating strokes provide a plurality of positions of said actuator arm in a position arc.

3. Apparatus as defined in claim 1, wherein said neutralizing linear actuator means comprise a single linear actuator, (including stop means secured to said assembly frame), a radial extension on said actuator shaft in opposed tangential relation to (said stop means) a portion of said assembly frame, said normally neutral position being located at one end of said position arc.

4. Apparatus as defined in claim 1, wherein said neutralizing linear actuator means comprise a pair of linear actuators, said normally neutral position being located within said position arc.

5. Apparatus as defined in claim 1, wherein said neutralizing linear actuator means and said positioning linear actuator means provide substantially the same linear actuating force in response to a single fluid pressure, said torque arm means in opposed relation to said neutralizing linear actuator means being substantially shorter than said torque arm means in opposed relation to said positioning linear actuator means.

6. Apparatus as defined in claim 1, wherein said neutralizing linear actuator means provides a substantially smaller linear actuating force than that of said positioning linear actuator means in response to a single fluid pressure, each of said torque arm means in opposed relation to each of said neutralizing and positioning linear actuator means being of substantially equal length.

7. Apparatus as defined in claim 1, wherein said neutralizing linear actuator means is activated by a fluid pressure which is substantially lower than the fluid pressure which activates said positioning linear actuator means.

8. Apparatus as defined in claim 1, wherein said rod portion includes length adjusting means.

9. A multi-position actuator comprising an assembly frame, a pair of neutralizing linear actuators mounted in said assembly frame, a plurality of positioning linear actuators mounted in said assembly frame, an actuator shaft pivotally mounted in said assembly frame, a torque arm secured to said actuator shaft in opposed relation to the actuating portions of each of said linear actuators, each of said pair of neutralizing linear actuators and each of said plurality of positioning linear actuators comprising a cylinder portion and a piston and rod portion, said rod portion in compressive surface contact with a cam follower rotatably mounted on said torque arm, an actuator arm secured to said actuator shaft, the lengths of actuating stroke of said pair of neutralizing linear actuators determining a neutral position of said actuator arm in a position arc, the lengths of actuating stroke of each of said plurality of positioning linear actuators determining a plurality of actuated positions of said actuator arm in said position arc, a continuously maintained fluid pressure in said pair of neutralizing linear actuators causing said actuator arm to assume a normally neutral position in said position arc, controlled fluid pressure in any one of said positioning linear actuators causing said actuator arm to assume a controlled actuated position in said position arc.

* * * * *